US008681373B2

(12) United States Patent
Lee et al.

(10) Patent No.: US 8,681,373 B2
(45) Date of Patent: Mar. 25, 2014

(54) IMAGE FORMING APPARATUS AND IMAGE FORMING METHOD THEREOF TO PRINT ALTERNATIVE IMAGES AT AN INTERVAL DURING A PRINT JOB

(75) Inventors: Jin-soo Lee, Suwon-si (KR); Byung-sun Ahn, Suwon-si (KR); Heung-sup Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 986 days.

(21) Appl. No.: 11/941,407

(22) Filed: Nov. 16, 2007

(65) Prior Publication Data

US 2008/0180702 A1 Jul. 31, 2008

(30) Foreign Application Priority Data

Jan. 31, 2007 (KR) ........................ 10-2007-0010124

(51) Int. Cl.
*G06F 15/00* (2006.01)

(52) U.S. Cl.
USPC ............. 358/1.9; 358/1.4; 358/504; 358/518; 358/521; 399/34; 399/71; 399/149; 399/162; 382/162; 382/167

(58) Field of Classification Search
USPC ........ 358/1.9, 1.4, 504, 518, 521; 399/34, 71, 399/149, 162; 382/162, 167
See application file for complete search history.

(56) References Cited

U.S. PATENT DOCUMENTS

| | | | | |
|---|---|---|---|---|
| 6,836,630 | B2 * | 12/2004 | Owen et al. | 399/112 |
| 7,469,118 | B2 * | 12/2008 | Inaba | 399/228 |
| 2003/0112457 | A1 * | 6/2003 | Akiyama et al. | 358/1.14 |
| 2004/0061887 | A1 * | 4/2004 | Murashima | 358/1.14 |
| 2005/0012764 | A1 * | 1/2005 | Kawakami | 347/5 |
| 2005/0243342 | A1 * | 11/2005 | Abramsohn | 358/1.9 |
| 2005/0281572 | A1 * | 12/2005 | Kawakami et al. | 399/49 |
| 2006/0238811 | A1 * | 10/2006 | Soma et al. | 358/1.16 |

FOREIGN PATENT DOCUMENTS

| | | | |
|---|---|---|---|
| EP | 0 883 283 | A2 | 12/1998 |
| EP | 883283 | A2 * | 12/1998 |
| JP | 2001-66842 | A | 3/2001 |
| JP | 2002-148888 | | 5/2002 |
| JP | 2006-106473 | A | 4/2006 |
| KR | 2006-90298 | | 8/2006 |

OTHER PUBLICATIONS

European Search Report mailed Mar. 10, 2011 in relating Application EP 08 10 1085.

Chinese Office Action mailed Mar. 3, 2011 in corresponding Chinese Application No. 200810001857.

Korean Office Action issued Jun. 21, 2011 in corresponding Korean Patent Application 10-2007-0010124.

(Continued)

*Primary Examiner* — Miya J Cato
(74) *Attorney, Agent, or Firm* — Staas & Halsey LLP

(57) ABSTRACT

An image forming apparatus and an image forming method therefor. The image forming apparatus includes: an image forming part, which forms printed and alternate printed images including different developing agents to a recording medium; and a controller which controls the image forming part to form a the printed and alternate printed images according to a comparison of number of pages of a print job and a reference number of pages, and a whether the images of the print job are of a single color.

19 Claims, 5 Drawing Sheets

(56) References Cited

OTHER PUBLICATIONS

Korean Decision of Rejection mailed Aug. 31, 2011 in corresponding Korean Patent Application 10-2007-0010124, Summarized.

Chinese Office Action issued Jan. 18, 2012 in corresponding Chinese Patent Application 2008-10001857X.

* cited by examiner

IMAGE FORMING APPARATUS AND IMAGE FORMING METHOD THEREOF TO PRINT ALTERNATIVE IMAGES AT AN INTERVAL DURING A PRINT JOB

CROSS-REFERENCE TO RELATED APPLICATION

This application claims the benefit of Korean Application No. 2007-10124, filed Jan. 31, 2007, in the Korean Intellectual Property Office, the disclosure of which is incorporated herein by reference.

BACKGROUND OF THE INVENTION

1. Field of the Invention

Aspects of the present invention relate to an image forming apparatus and an image forming method thereof.

2. Description of the Related Art

An image forming apparatus forms an image on a recording medium, according to a printing signal from a host device. In general, an image forming apparatus includes: a paper feeding part, which stacks pages of the recording medium; an image forming part, which forms an image on the recording medium from the paper feeding part; and a paper discharging part, which discharges the recording medium having the image formed thereon. An image forming apparatus can be classified as a mono-type, where images are printed in grayscale on a recording medium, and a color-type, where images are printed in color on a recording medium. Color images can be formed by a combination of four colors, such as, yellow, magenta, cyan, and black.

FIG. 1 schematically illustrates a configuration of a conventional color-type image forming apparatus 10. The image forming apparatus 10 includes: a paper feeding part (not shown), which stacks pages of a recording medium; developing devices 30Y, 30M, 30C, and 30K, which apply different developing agents to the recording medium; and a transport belt 23, which sequentially transfers the recording medium to the developing devices 30Y, 30M, 30C and 30K.

In an image forming method using the image forming apparatus 10, a printing signal is received from a host device. The recording medium is picked up from the paper feeding part and is brought into contact with a photosensitive body 31 of each developing device 30, while being transferred by the transport belt 23. Transfer rollers 25Y, 25M, 25C, and 25K, respectively corresponding to the developing devices 30Y, 30M, 30C and 30K, are disposed at a rear side of the transport belt 23 and assist in the transfer of developing agents from the photosensitive bodies 31 to the recording medium. In this way an image is formed. At least two different developing agents overlap to form a color image.

The conventional image forming apparatus 10 drives the developing devices 30Y, 30M, 30C, and 30K, in response to the printing signal (print job) from the host device. Even if images to printed are made of only one color applied by a specific developing device, all of the developing devices 30 are driven. The photosensitive bodies 31, of the specific developing devices 30 corresponding to one or more colors of the image data, apply a developing agent while being in contact with the recording medium, but the other developing devices operate without applying a developing agent.

The developing agent functions as a lubricant, to prevent components in the developing devices from being worn when they are driven. If the components are driven without the flowing of the developing agent, they are worn by contact and friction. For example, if the photosensitive body is in contact with the recording medium without applying the developing agent, it may be scratched on its surface. If image data corresponding to a developing device of a specific color, is applied in large quantities, e.g., a hundred pages at a time, the components of the other developing devices of different colors may be prematurely worn out.

If the components of an infrequently used developing device are worn out, the developing device may not function properly even if it retains a supply of a developing agent. That is, a developing device of a color which is not frequently used has a decreased life span. In this case, a user should replace the developing device, even though it retains a supply of developing agent, resulting in waste.

SUMMARY OF THE INVENTION

Aspects of the present invention relate to an image forming apparatus that can extend the lifespan of an infrequently used developing device. Aspects of the present invention also relate to an image forming method therefor. Additional aspects of the present invention will be set forth in the description which follows and will be obvious from the description, or may be learned by practice of the aspects of the present invention.

The foregoing and/or other aspects of the present invention can be achieved by providing an image forming apparatus including: an image forming part, which forms images of a single color by applying different developing agents, or combinations thereof, onto pages of a recording medium; and a controller that controls the image forming part, to form the images of the single color using different developing agents. The controller controls the image forming part to use different developing agents to produce the single color for a portion of the images printed, if the images are to be printed on a number of pages of the recording medium that are greater than or equal to a reference number of pages.

According to various aspects of the present invention, the image forming part includes a plurality of developing devices, which each include one of a yellow developing agent, a magenta developing agent, a cyan developing agent, and a black developing agent. The single color can be grayscale.

According to various aspects of the present invention, if an output signal (print job) including a number of grayscale images, is input, the controller compares a number of pages of the print job to a reference number of pages. If the number of pages equals or exceeds the reference number of pages, the controller controls the image forming part to form some of the grayscale images using the black developing agent and to form some of the grayscale images by combining the yellow, magenta, and cyan developing agents, on pages of the recording medium.

According to various aspects of the present invention, the image forming part includes the plurality of developing devices. The controller controls the image forming part to output the image by combining developing agents other than the developing agent(s) used to form the single color, to form an image on the recording medium, if a print job has a number of pages equaling or exceeding a reference number of pages, of the single color.

According to aspects of the present invention, one or more test pages are formed. According to aspects of the present invention, the controller controls the image forming part to output the test pages, at an interval, interspersed among the pages of the print job.

According to aspects of the present invention, the image forming apparatus further includes a display, which displays an operation state of the image forming part. The controller controls the display to indicate the location of an output page on which the image forming part forms the test page, in addition to the reference number of pages.

Other aspects of the present invention relate to an image forming method which uses an image forming apparatus. The image forming apparatus can include an image forming part, which forms a printed image and an alternate printed image by applying different colored developing agents on a recording medium. The method includes: determining whether a print job includes a reference number of pages or more, of the same single color, when an output signal is input; and forming a image by a combination of a developing agent of at least one color besides the single color, on a recording medium. The alternate printed images can be formed on a number of pages corresponding to a proportion of the pages of a print job. The alternate printed image can be a test page.

According to aspects of the present invention, the image forming part includes a plurality of developing devices, which include a yellow developing agent, a magenta developing agent, a cyan developing agent, and a black developing agent. The image forming method includes forming an image on the recording medium, which corresponds to the proportion of the reference number of pages, by a combination of the yellow, magenta, and cyan developing agents, while forming the image, if the output signal includes at least the reference number of pages having only black developing agent.

Still other aspects of the present invention may include providing an image forming apparatus including: an image forming part, which forms an image by applying colored developing agents to a recording medium; a transport belt, which transports the recording medium to the image forming part; and a controller, which controls the image forming part to form an image on the transport belt by combining the colored developing agents other than a particular developing agent that is ordinarily used to print images of a print job, if a number of pages of the print job is at least equal to a reference number of pages.

The image forming apparatus can include a belt cleaning part, which cleans a transport belt. The controller controls the belt cleaning part to clean the transport belt when the image is completely formed on the transport belt.

Yet another aspect of the present invention may be achieved by providing an image forming method including: determining whether a print job includes images of a single color and a number of pages equal to or exceeding a reference number of pages; forming an image on a recording medium, by combining at least one developing agent other than a first developing agent used to produce the single color on the transport belt, if the print job includes at least the reference number of pages of a single color; cleaning the transport belt; and forming the images using the first developing agent on pages of the recording medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
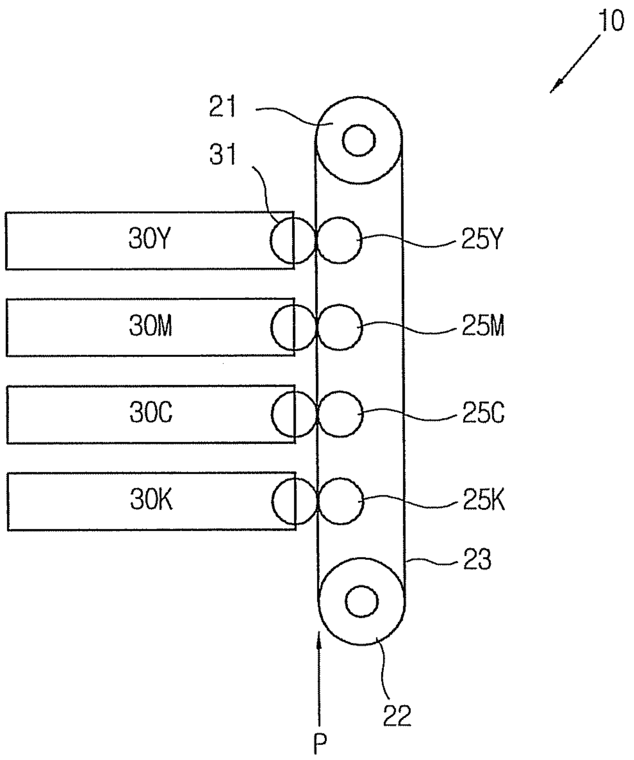
FIG. 1 (RELATED ART)
FIG. 1 schematically illustrates a configuration of a conventional image forming apparatus.

Reference will now be made in detail to various embodiments of the present invention, examples of which are illustrated in the accompanying drawings. Like reference numerals refer to like elements throughout. The embodiments are described below, in order to explain the present invention, by referring to the figures.

Figure 2:
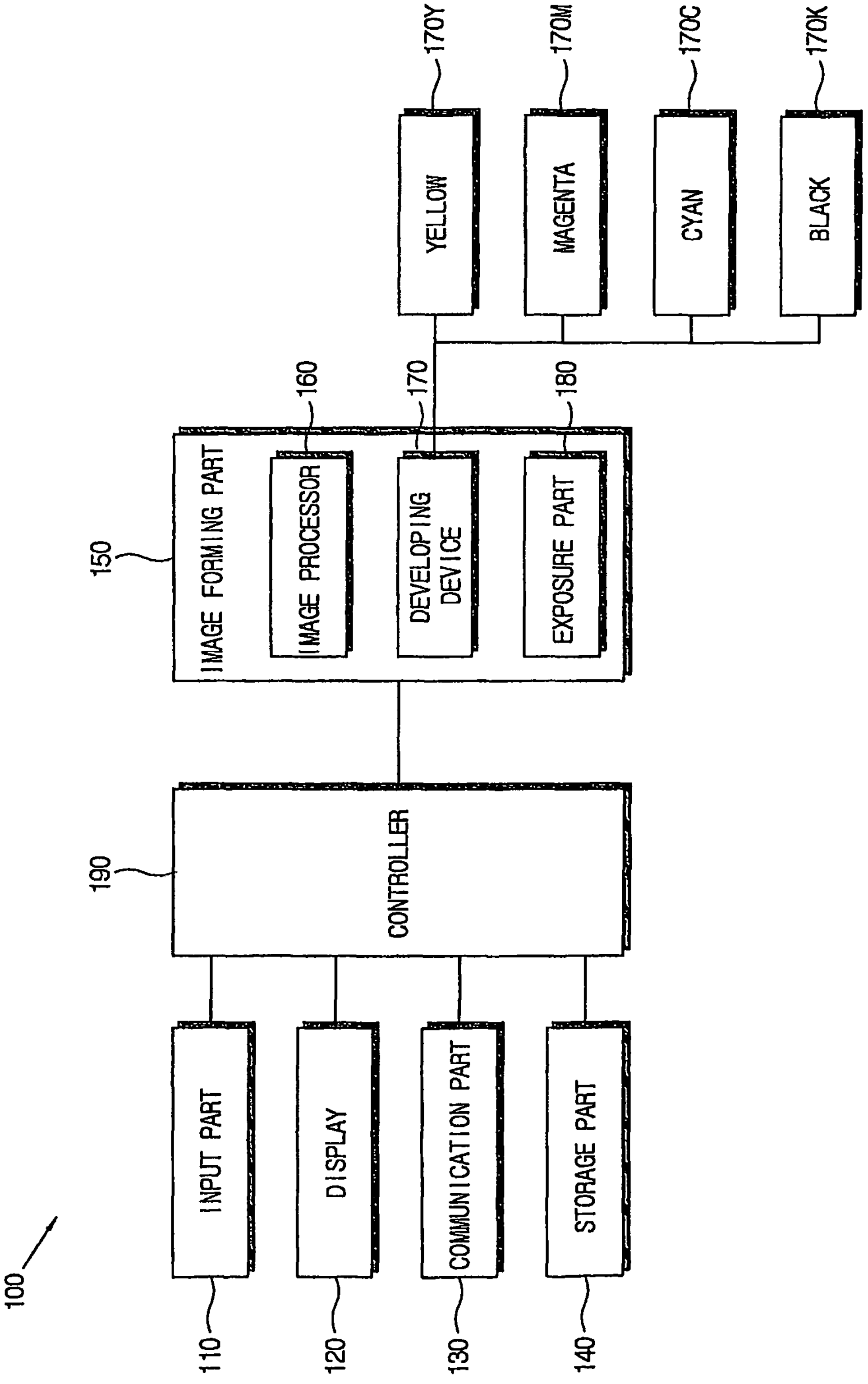
FIG. 2 is a block diagram to schematically illustrate a configuration of an image forming apparatus, according to an exemplary embodiment of the present invention.
Figure 3:
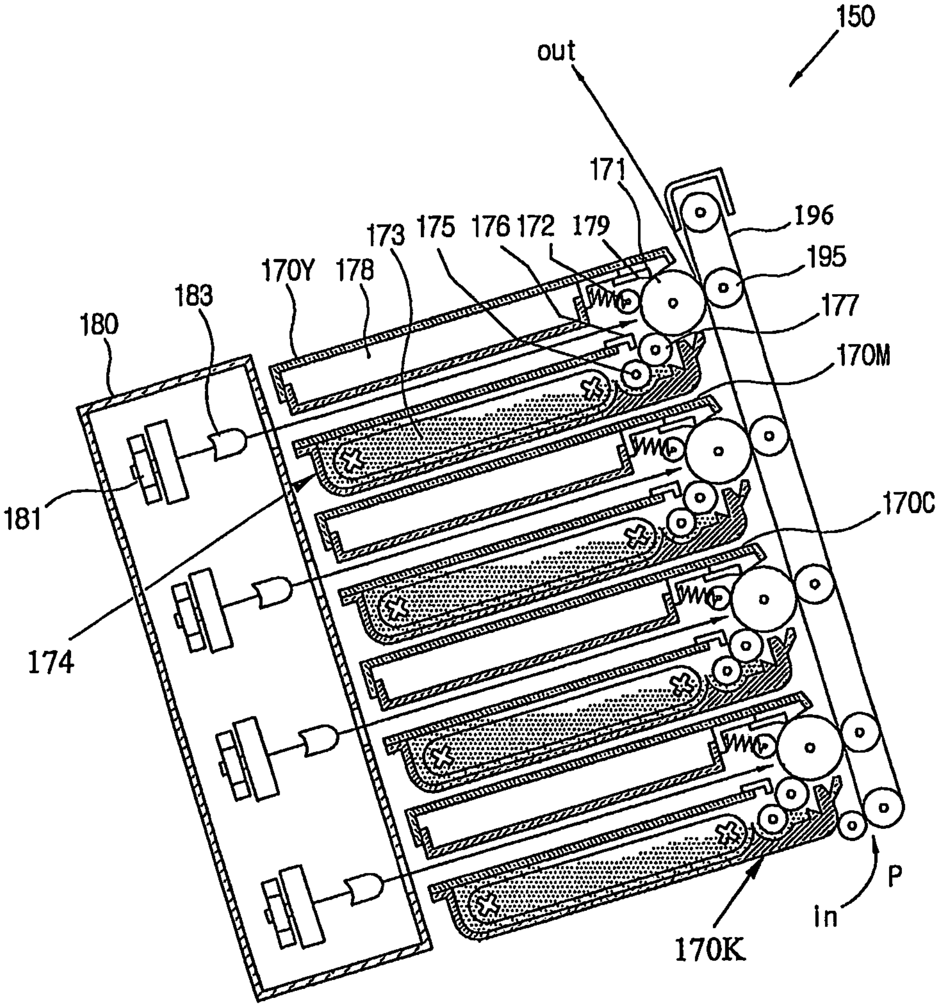
FIG. 3 is a cross-sectional view of a configuration of an image forming part, according to an exemplary embodiment of the present invention.

Referring to FIGS. 2 and 3, an image forming apparatus 100 includes: an input part 110, which receives an output signal relating to a print job; a display 120, which displays an operation state of the image forming apparatus 100; a communication part 130, which receives the print job from an external device; a storage part 140, which stores the print job; an image forming part 150, which forms an image on a recording medium; and a controller 190, which controls the image forming part 150, according to a number of pages of the print job.

A recording medium, as referred to herein, can be any medium suitable for printing. For example, a recording medium can be paper, transparencies, and the like.

The input part 110 receives an output signal from a user. The output signal can include a number of pages of a print job, an output depth, color information related to the color of images of the print job, etc. When the image forming apparatus 100 is connected to an external device (not shown), the input part 110 may be a keyboard and/or a mouse of the external device. Also, the input part 110 may be an input panel. The input panel can include a number key, a letter key, a function key, etc. and can be disposed outside the image forming apparatus 100.

The display 120 displays the operation state of the image forming part 150, according to a control signal from the controller 190. If a print job, including a number of pages that is greater than or equal to a reference number of pages and color information specifying a single color for images of the print job, is input through the input part 110, the display 120 may display a message to indicate that pages of a recording medium output from the image forming part 150 include a test page. The display 120 displays a graphic user interface (GUI), which is set up corresponding to the operation state of the image forming part 150, so that the user can recognize the operation state of the image forming apparatus 1. The display 120 may be provided as a thin panel, such as, a liquid crystal display (LCD), a plasma display panel (PDP), etc.

The communication part 130 communicates with the external device and receives the print job. The communication part 130 may be provided as a communication cable or a communication card such as a LAN card. If the external device is a portable storage medium which stores an image data, the communication part 130 may be provided as a connecting part of the portable storage medium.

The storage part 140 stores the print job received through the communication part 130. If the image forming apparatus 100 includes a scanner (not shown) and/or a facsimile machine (not shown), the storage part 140 stores image data generated by the scanner and/or the facsimile machine. The storage part 140 may be provided as a volatile memory or a nonvolatile memory.

The image forming part 150 forms printed images on one or more pages of the recording medium. The image forming part 150 includes: an image processor 160, which can convert color information of a print job into output color properties, (single color images); a plurality of developing devices 170, which apply different colored developing agents (toner) to the recording medium; and an exposing part 180, which forms electrostatic latent images, on photosensitive bodies 171 of the developing devices 170.

The image processor 160 converts image data of a print job into one or more single color images. Each single color image can be formed on one of the photo sensitive bodies 171, as an electrostatic latent image. A developing agent can be added to the electrostatic latent image to form a toner image. Generally, a single color image for each of three primary colors, i.e., red, green, and blue, is produced for most color images. Each of the developing devices 170 includes a developing agent corresponding to one of the three primary colors or black.

Figure 4:
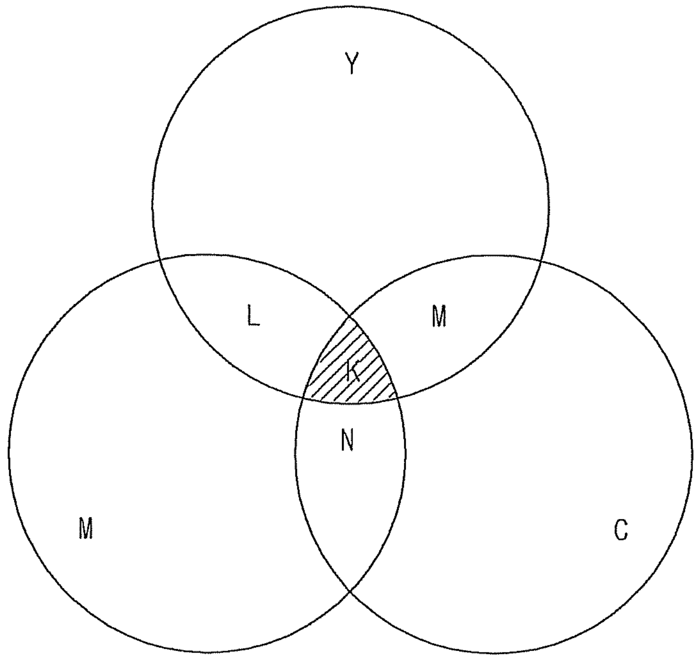
FIG. 4 illustrates an example of a color pattern formed the image forming part.
Figure 5:
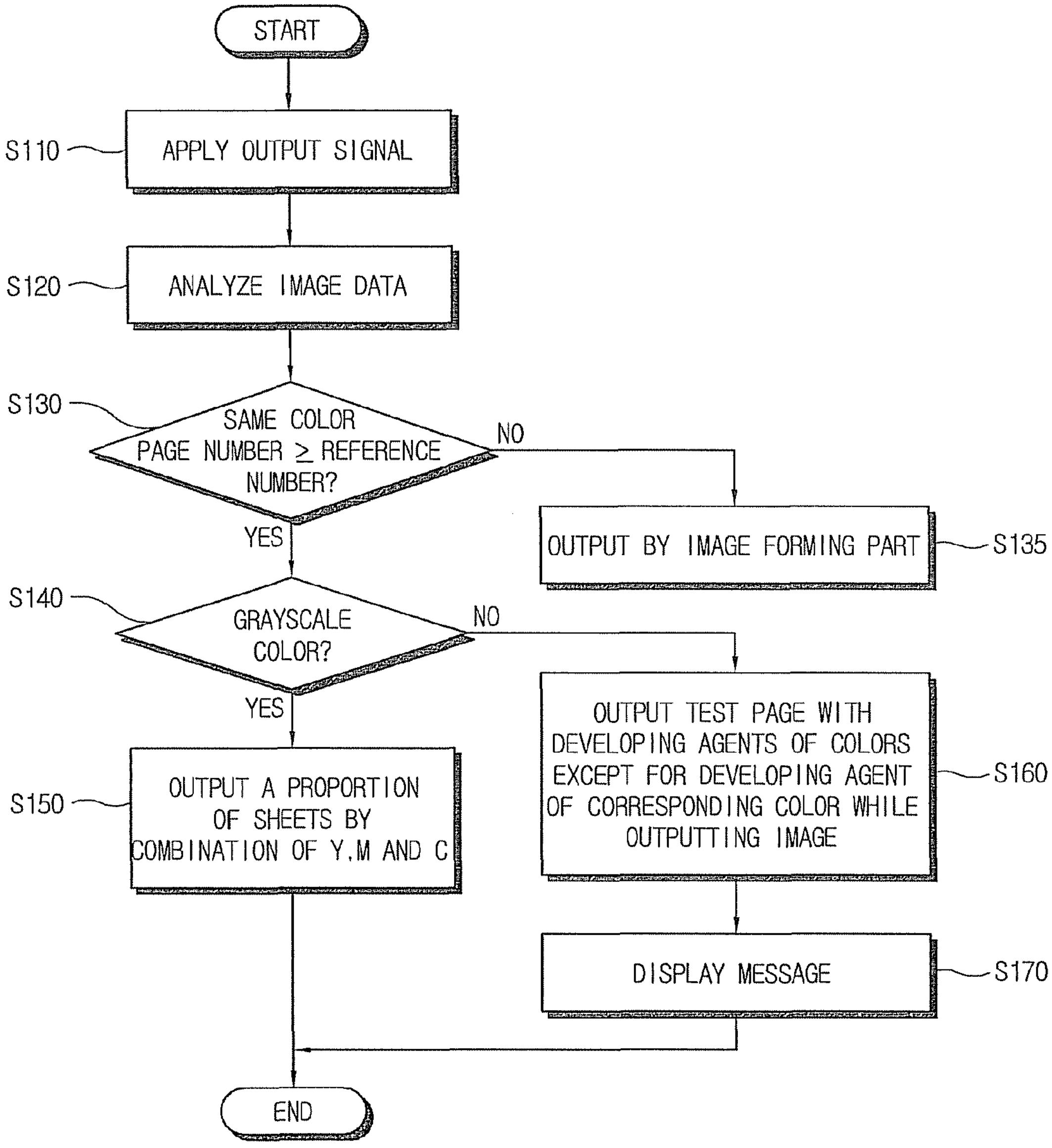
FIG. 5 is a flow chart to illustrate an image forming method of the image forming apparatus, according to an exemplary embodiment of the present invention.

Referring to FIG. 4, the image processor 160 produces single color images of varying intensities, which are used to produce various colors on the recording medium, using mixtures of yellow, magenta, and cyan developing agents. For example, if an image data is 8-bits, the image processor 160 can display the image data in a 256-color mode.

The developing devices 170 apply combinations of the developing agents, according to the single color images, to the recording medium. The developing agents can be overlapped to produce various colors, according to the image data processed by the image processor 160, to form an image.

FIG. 3 schematically illustrates a configuration of the image forming part 150 of a single pass type. The developing devices 170 each include the photosensitive body 171, a charging roller 172, a developing agent storage part 174, a supply roller 175, a developing agent regulating member 176, a developing roller 177, a remnant collecting part 178, and a cleaning member 179. The photosensitive body 171 applies a toner image, comprising a developing agent, onto a page of a recording medium that is transferred by a transport belt 196. One or more of the transferred toner images can be referred to as a printed image. The charging roller 172 charges the photosensitive body with an electric charge. The developing roller 177 applies a developing agent to an electrostatic latent image on the photosensitive body 171 to form the toner image. The supply roller 175, supplies a developing agent 173 in the developing agent storage part 174, to the developing roller 177. The developing agent regulating member 176 regulates an amount of the developing agent 173 supplied from the supply roller 175, to maintain a uniform thickness of the developing agent 173 on a surface of the developing roller 177. The cleaning member 179 cleans any remaining developing agent 173 from a surface of the photosensitive body 171. The remnant collecting part 178 stores the developing agent 173, which has been separated from the surface of the photosensitive body 171 by the cleaning member 179.

The developing devices 170 each include a developing agent 173 of a particular color, such as, yellow (Y), magenta (M), cyan (C), and black (K). The developing devices 170 can be referred to as a yellow developing device 173Y, a magenta developing device 170M, a cyan developing device 170C, and a black developing device 170K, according to the color of developing agent 173 contained therein. The developing devices 170 sequentially apply developing agents 177 to a page of the recording medium, transferred by the transport belt 196, according to a control signal from the controller 190, thereby forming an image.

An exposure part 180 forms electrostatic latent images on the photosensitive bodies 171 of the developing devices 170, according to the single color images converted by the image processor 160. Referring to FIG. 3, the exposure part 180 may be provided to correspond to the same or fewer number of the developing devices 170. The exposure part 180 includes: a light source part (not shown) to provide light; a polygonal mirror assembly 181, which scans light from the light source part; and a reflection mirror 183 which reflects the light scanned by the polygonal mirror assembly 181 to the photosensitive body 171. The components of the exposure part 180 may each correspond to one or more of the developing devices 170.

The controller 190 estimates a color and a quantity of the image data and controls the image forming part 150, according to the output signal (print job) input through input part 110. If an output signal for printing includes a number of pages that is more than a reference number of pages and color information indicating the use of a single color, the controller 190 controls the image forming part 150 to form the printed images and the alternate printed images. As referred to herein, a single color refers to a color and any variations in intensity and/or brightness of the color. For example, if the single color is yellow, it includes any variation of yellow that can be made using different amounts of a yellow developing agent. Similarly a black or grayscale color includes all variations of grey that can be produced using a black developing agent.

The alternate printed images can be formed by combining toner images that include alternate developing agents, i.e., developing agent(s) other than the developing agent(s) used to initially produce the single color. For example, if an output signal (print job) includes at least a reference number of pages and color information indicating grayscale images, the controller 190 controls the image forming part 150 to form a certain portion of the printed images as alternate printed images, by combining yellow, magenta, and cyan developing agents. More particularly, if the number of pages is 110, the color information indicates grayscale images, and the reference number of pages is 100; the controller 190 controls the image forming part 150, to form the printed images, using the black developing agent 173 on 100 pages of the recording medium and to form the alternate printed images, using a combination of the yellow, magenta, and cyan developing agents 173 on 10 pages of the recording medium.

In other words, to produce 110 grayscale images the controller 190 controls the image processor 160 to produce single color images using the black developing device 170K for 100 pages, and to produce single color images for the yellow, magenta, and cyan developing devices 170Y, 170M, and 170C for the other ten pages. Then, the exposure part 180 forms electrostatic latent images, corresponding to the single color images, on the photosensitive bodies 171 of the respective developing devices 170, An appropriate developing agent 173 is added to the electrostatic images, to form toner images. The toner images are transferred to 100 pages of a recording medium, to form grayscale printed images thereon. The toner images of the yellow, magenta, and cyan developing devices 170Y, 170M, and 170C are overlapped, to produce grayscale printed images on ten pages of the recording medium. The images on the ten pages can be referred to as alternate printed images.

Here, the controller 190 may set a proportion of the pages print job to be formed using different developing agents than those used to form the rest of the pages of the print job. The portion can be, i.e., five percent, ten percent, etc., of the pages of a print job. The portion can be referred to as alternate printed images. However, the proportion should generally not exceed about ten percent, to reduce the consumption of the yellow, magenta, and cyan developing agents.

The printed images and alternate printed images can be printed in any order. For example, where ten alternate printed images and 100 printed images are printed, the alternate printed images can be printed on every tenth page of a print job. The alternate printed images can be test inserted after every tenth page of a print job, i.e. added in addition to the pages of a print job. Thus, the developing agents keep periodically running in the developing devices 170 used to print the alternate printed images, thereby reducing the wear of the components therein. The sequence of the printing of the printed images and alternate printed images may be modified, depending on the reference number of pages, an output concentration selected by a user, etc.

If a print job having at least the reference number of pages and images having single color other than grayscale is input, the controller 190 controls the image forming part 150 to form one or more alternate printed images by a combination of the developing agents of other colors except for the developing agent of the single color.

Alternate printed images can be formed for any single color, not just the exemplary grayscale colored images, as disclosed above. In particular alternate printed images can be formed for single colors made up of combinations of different developing agents. For example, if the number of pages is greater than or equal to the reference number of pages, the color information indicates a single color other than grayscale, the controller 190 determines a an alternate combination of developing agents to produce the single color. Accordingly, the controller 190 classifies cases where the single color is realized by a developing agent of one color, e.g., the yellow Y, the magenta M, or the cyan C in FIG. 4, or by combination of developing agents of two colors, i.e., colors L, M and N in FIG. 4. Then, the controller 190 controls the image forming part 150 to form an alternate printed image by using different combinations of developing agents.

The a print job may include text and/or an image. One or more test pages can be added to the print job. A portion of the test page may be printed to reduce consumption of the developing agents. For example, if a plurality of blue printed images are to be formed, the controller 190 is informed by the image processor 160 that the blue color is realized by combination of the yellow developing agent Y and the cyan developing agent C. The controller 190 controls the image forming part 150 to print an image by the combination of the yellow developing agent Y and the cyan developing agent C on one hundred pages and can print alternate printed images on ten pages of the print job. The alternate printed images can have a yellow color formed by a combination of the magenta developing agent M and the black developing agent K.

The alternate printed images can be test pages. The test pages can be formed of a combination of the developing agents other than the developing agent(s) that form the single color. In some embodiments test pages can be used when a single color may not be suitably replicated using other developing agents.

The test pages are not included in the reference number of pages set up by a user. The test page may be printed a minimum number of times to reduce the consumption of the developing agents.

The test pages are printed at an interval among the printed images. The interval can be set by a user or determined the controller 190 using a reference proportion related to the reference number of sheets. For example, if an output signal to print one hundred pages is applied, the test page can be printed every 50 pages. The controller 190 can control the display 120 to display a message indicating that the printed pages of the recording medium include the test page(s), if the test page(s) are printed. Thus, the user notices in advance that a test page is designated to be printed, and can be informed of the location of the test pages with regard to the pages of the recording medium.

Hereinafter, an image forming process of the image forming apparatus 100 according to the present exemplary embodiment of the present invention will be explained with reference to FIGS. 2 to 5.

In operation S110, the controller 190 detects whether an output signal related to a print job is applied by a user. In operation S120, if an output signal is detected, the controller 190 analyzes a number of pages of the print job and color information of images of the print job.

In operation S130, if the controller 190 determines that the color information does not indicates a single color or the number of pages is less than the reference number of pages, the method proceeds to operation S135. In operation S130, if the controller 190 determines that the color information does indicates a single color and the number of pages is greater than or equal to the reference number of pages, the method proceeds to operation S140.

In operation S135 the controller 190 controls the image forming part 150 to form printed images using the image data.

In operation S140, if the controller 190 determines that the color is not grayscale, the method proceeds to operation S160. If the controller determines that the single color is grayscale the method proceeds to operation S150.

In operation S150, the controller 190 controls the image forming part 150 to form printed images and alternate printed images using the image data of a print job.

In operation S160, the controller 190 controls the image forming part 150 to output alternate images that are test pages having developing agents of colors which are not used to form the single color. The method then proceeds to operation S170.

In operation S170 the controller 190 controls the display 120 to display a message indicating that one or more test pages are to be printed and the page numbers of the test pages. The method can then proceed to operation S150.

In an image forming apparatus 100 according to another exemplary embodiment of the present invention, as a result of an image data determined in the number of pages and a color, if an output signal to print the image data involved with the reference number of pages or more on a single color is applied, an image is formed, by combination of developing agents of colors except for the developing agent of the single color, on the transport belt 196. For example, if a print job having one hundred grayscale pages input, the controller 190 controls a feeding part (not shown) to stop providing pages of the recording medium after printing a proportion of pages, e.g., fifty pages to one hundred pages. An image forming part 150 then forms an image on the transport belt 196, by combination of yellow, magenta and cyan developing agents. Then, the controller 190 controls a cleaning part (not shown) provided at one side of the transport belt 196, to clean developing agents from a surface of the transport belt 196.

When the transport belt 196 is completely cleaned, the controller 190 controls the feeding part to provide addition pages of the recording medium and the image forming part 150 forms an image on the other pages, e.g., fifty pages. Here, the number of times and an interval of forming an image (test page) on the transport belt a may be modified on the reference number of pages.

In the image forming apparatus 100 according to the present exemplary embodiment, a test page is not included in the reference number of pages set up by the output signal from the user, thereby minimizing a user's inconvenience. The image forming part 150 in the present exemplary embodiment is in a single-pass type, but may be provided as a multi-pass type.

The image forming apparatus according to the exemplary embodiments of the present invention may further include a scanner which scans an image on a copy to generate an image data, and a fax which sends/receives an image data to/from a separate fax machine through a communication part. In this case, the controller 190 performs the forgoing processes, if a user wants to apply a scanning signal on a plurality of copies through the scanner and form a scanned data on a recording medium, thereby preventing wear-out of the components in the developing devices. In the case of a fax data from the fax machine, the foregoing processes are employed as well.

As described above, in the present invention, if an output signal (print job), having at least the reference number of pages of a single color, is input, developing agents of colors except those forming the single color, keep periodically running in developing devices, thereby minimizing wear-out of components of the developing devices. Accordingly, the life span of a developing device is extended, and a deterioration of the quality of an image, due to wear of the developing device, is reduced.

Although a few embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. An image forming apparatus comprising:

an image forming part which forms printed images of a single color and one or more alternate printed images on pages of a recording medium by using different colors of developing agents for the printed and alternate printed images;

a controller which controls the image forming part to form the one or more alternate printed images by using colored developing agents not used to form the printed images, if a print job comprises images of a single color and a number of pages that is at least a reference number of pages; and wherein the controller controls the image forming part to form the one or more alternate printed images at an interval among the printed images on every Nth page of the current print job being processed, N being an integer value;

wherein the every Nth page on which the alternate printed image is formed is included in pages corresponding to the current print job.

2. The image forming apparatus according to claim 1, wherein the image forming part includes a plurality of developing devices respectively comprising a yellow developing agent, a magenta developing agent, a cyan developing agent, and a black developing agent, and the single color is grayscale.

3. The image forming apparatus according to claim 2, wherein if the print job comprises at least the reference number of grayscale images, the controller controls the image forming part to use the black developing agent to form the printed images and a combination of the yellow, magenta and cyan developing agents to form the alternate printed images.

4. The image forming apparatus according to claim 1, wherein the image forming part includes a plurality of developing devices respectively comprising a yellow developing agent, a magenta developing agent, a cyan developing agent and a black developing agent, and the controller controls the image forming part to output the at least one alternate printed image is a test page formed from a combination of developing agents not used to produce the single color, if the print job comprises images of a single color other than grayscale and a number of pages that is at least the reference number of pages.

5. The image forming apparatus according to claim 4, wherein the controller controls the image forming part to output a plurality of the test pages on pages of the recording medium at an interval among the printed images.

6. The image forming apparatus according to claim 5, wherein a number of the test pages printed is no more than ten percent of a number of printed images printed.

7. The image forming apparatus according to claim 6, further comprising a display which displays an operation state of the image forming part, wherein the controller controls the display to indicate whether a test page has been printed.

8. The image forming apparatus according to claim 4, further comprising a display which displays an operation state of the image forming part, wherein the controller controls the display to indicate whether a test page has been printed.

9. The image forming apparatus according to claim 5, further comprising a display which displays an operation state of the image forming part, wherein the controller controls the display to indicate whether a test page has been printed.

10. An image forming apparatus comprising:

an image forming part which forms printed images of a single color and one or more alternate printed images on pages of a recording medium by using different colors of developing agents for the printed and alternate printed images;

a transport belt which transports the recording medium to the image forming part;

a controller which controls the image forming part to form the one or more alternate printed images on the transport belt by colored developing agents except for a developing agent of a single color that is used to form the printed images, if a print job related to the printed images comprises images of a single color and a number of pages that is at least a reference number of pages; and wherein the controller controls the image forming part to form the one or more alternate printed images at an interval among the printed images on every Nth page of the current print job being processed, N being an integer value;

wherein the every Nth page on which the alternate printed image is formed is included in pages corresponding to the current print job.

11. The image forming apparatus according to claim 10, further comprising a belt cleaning part which cleans a transport belt, wherein the controller controls the belt cleaning part to clean the transport belt when the alternate printed image is completely formed on the transport belt.

12. An image forming method which comprises an image forming apparatus including an image forming part which forms an image by applying different colors of developing agents on a recording medium and a transport belt which transports a recording medium to the image forming part, comprising:

determining whether a print job comprises at least a reference number of pages of the same single color;

forming printed images and at least one alternate printed image by combination of at least one developing agent except for a developing agent of the single color realized on the transport belt while forming the image data if an output signal involved with the reference number of pages or more on the single color is input;

cleaning the transport belt;

forming the image data involved with the single color on the recording medium; and wherein the alternate printed images are formed at an interval among the printed images on every Nth page of the current print job being processed, N being an integer value;

wherein the every Nth page on which the alternate printed image is formed is included in pages corresponding to the current print job.

13. An image forming apparatus, comprising:

an image forming part to form printed images and alternate printed images on pages of a recording medium, wherein the printed images relate to images of a print job input to the image forming apparatus, and the printed images and the alternate printed images are formed using different developing agents;

a controller to compare a number of pages of the print job to a reference number of pages, to determine if the images of the print job comprise a single color, and to control the image forming part based on the comparison and the determination; and wherein the controller controls the image forming part to form the one or more alternate printed images at an interval among the printed images on every Nth page of the current print job being processed, N being an integer value;

wherein the every Nth page on which the alternate printed image is formed is included in pages corresponding to the current print job.

14. The image forming apparatus of claim 13, wherein the controller is to control the image forming part to form both the printed images and the alternate printed images if the number of pages is greater than or equal to the reference number or pages and the images are a single color.

15. An image forming method comprising:

determining using a processor whether images of a print job consist of a single color, and comparing a number of pages of the print job, to a reference number of pages;

forming one or more printed images and one or more alternate printed images on pages of a recording medium, if the images of the print job consist of the single color and the number of pages is greater than or equal to the reference number of pages, wherein the printed images and the alternate printed images are formed using different developing agents, and the printed images relate to the images of the print job; and wherein the alternate printed images are formed at an interval among the printed images on every Nth page of the current print job being processed, N being an integer value;

wherein the every Nth page on which the alternate printed image is formed is included in pages corresponding to the current print job.

16. The method of claim 15, wherein:

the single color is grayscale;

the printed images are formed using a black developing agent; and the alternate printed images are formed using a combination of yellow, magenta, and cyan developing agents.

17. The method of claim 16, wherein the printed images and the alternate printed images relate to the images of the print job.

18. The method of claim 15, wherein the alternate printed images are test pages consisting of developing agents not used to print the single color.

19. The method of claim 15, wherein the printed images and the alternate printed images relate to images of the print job and the alternate printed images make up no more than about ten percent of the images of the print job.

* * * * *

UNITED STATES PATENT AND TRADEMARK OFFICE

CERTIFICATE OF CORRECTION

PATENT NO. : 8,681,373 B2
APPLICATION NO. : 11/941407
DATED : March 25, 2014
INVENTOR(S) : Lee et al.

It is certified that error appears in the above-identified patent and that said Letters Patent is hereby corrected as shown below:

On the Title Page Item [57] (ABSTRACT), Line 6, delete “a the” and insert -- a -- therefor.

Signed and Sealed this
First Day of July, 2014

Michelle K. Lee
*Deputy Director of the United States Patent and Trademark Office*